(12) United States Patent
Tanaka

(10) Patent No.: US 6,914,582 B2
(45) Date of Patent: Jul. 5, 2005

(54) FOOD AND DRINK ORDERING SYSTEM IN EATING AND DRINKING PLACE

(75) Inventor: Kunihiko Tanaka, Sakai (JP)

(73) Assignee: Kura Corporation Ltd., Osaka (JP)

( * ) Notice: Subject to any disclaimer, the term of this patent is extended or adjusted under 35 U.S.C. 154(b) by 238 days.

(21) Appl. No.: 10/053,631

(22) Filed: Jan. 22, 2002

(65) Prior Publication Data

US 2002/0103751 A1 Aug. 1, 2002

(30) Foreign Application Priority Data

Jan. 26, 2001 (JP) ........................................ 2001-018056

(51) Int. Cl.$^7$ ............................................... G09G 5/00
(52) U.S. Cl. ........................ 345/1.1; 345/173; 345/157
(58) Field of Search .......................... 345/156, 38, 157, 345/1.1, 1.2, 173, 502, 2.1, 2.2, 2.3; 715/700, 703, 704, 709, 714, 716, 748; 703/38

(56) References Cited

U.S. PATENT DOCUMENTS

| | | | | |
|---|---|---|---|---|
| 4,349,086 A | * | 9/1982 | Yamada ........................ | 186/49 |
| 4,677,308 A | | 6/1987 | Wroblewski et al. | |
| 5,235,509 A | | 8/1993 | Mueller et al. | |
| 5,482,139 A | | 1/1996 | Rivalto | |
| 5,720,363 A | | 2/1998 | Kipp | |
| 5,845,263 A | * | 12/1998 | Camaisa et al. .............. | 705/27 |
| 5,890,136 A | | 3/1999 | Kipp | |
| 6,145,628 A | * | 11/2000 | Tanaka ......................... | 186/50 |
| 6,179,088 B1 | * | 1/2001 | Lai .............................. | 186/49 |
| 6,415,555 B1 | * | 7/2002 | Montague .................... | 52/36.2 |
| 2002/0196204 A1 | * | 12/2002 | Matthew Senn ............. | 345/30 |

FOREIGN PATENT DOCUMENTS

GB   2150728 B  *  11/1984  ........... G09F/23/06

OTHER PUBLICATIONS

U.S. Appl. No. 10/037,392, filed Jan. 3, 2002.

* cited by examiner

Primary Examiner—Nick Corsaro
Assistant Examiner—Shaima Q. Aminzay
(74) Attorney, Agent, or Firm—Frishauf, Holtz, Goodman & Chick, P.C.

(57) ABSTRACT

A food and drink ordering system in an eating and drinking place for allowing a customer to make a precise order of a desired food and drink from the customer's table to a kitchen. The food and drink ordering system includes image display means and order input means for inputting information on the food and drink ordered, both of which are provided at the customer's table; order display means, set in the food and drink supplying place, for displaying the information on contents and place of the order; and a control unit having a menu display function of displaying information on available foods and drinks on the image display means at the customer's table and an information function of giving the information on the selected food and drink to the kitchen when the customer selects any item from the information on the available foods and drinks displayed on the image display means by use of the order input means.

3 Claims, 7 Drawing Sheets

FOOD AND DRINK ORDERING SYSTEM IN EATING AND DRINKING PLACE

BACKGROUND OF THE INVENTION

1. Field of the Invention

The present invention relates to a food and drink ordering system mainly for use in an eating and drinking place with carrying means to carry food and drink from the kitchen to customers' tables.

2. Prior Art

In general, a revolving sushi restaurant and a like eating and drinking place is provided with conveyance equipment to carry food and drink from the kitchen to customers' tables and an intercom (an intercommunication system) provided between the customers' tables and the kitchen. When a customer gives his/her order from his/her table in this eating and drinking place, he/she says the order to the kitchen through the intercom on the customer's table side.

After the order is received by the kitchen side through the intercom, the order is made up and delivered from the kitchen to the orderer's table via the conveyance equipment.

However, the eating and drinking place using the intercom as the ordering means has the problem that the order given through the intercom is hard to hear precisely, so that the order is sometimes heard wrong by the kitchen side or the order sometimes remains undelivered from the kitchen to the orderer by an oversight even when the order is received by the kitchen side.

In consideration of this actual situation, the present invention has been made. It is the object of the present invention to provide a food and drink ordering system in an eating and drinking place that can precisely give an order to a food and drink supplying place from each customer's table.

SUMMARY OF THE INVENTION

The present invention is directed to a novel food and drink ordering system in an eating and drinking place for allowing a customer to order any desired food and drink from the customer's table to a food and drink supplying place, which comprises image display means and order input means for inputting information on the food and drink ordered, both of which are provided at the customer's table; order display means, set in the food and drink supplying place, for displaying the information on contents and place of the order; and a control unit having a menu display function of displaying information on available foods and drinks on the image display means at the customer's table and an information function of giving the information on the selected food and drink to the food and drink supplying place when the customer selects any item from the information on the available foods and drinks displayed on the image display means by use of the order input means.

This construction of the present invention provides the advantage of enabling the order to be precisely given to the food and drink supplying place from each customer's table.

In the food and drink ordering system mentioned above, a card reader for reading the information recorded in a card having the function of making settlement of the charge for purchased goods and services is set in the customer's table, and the control unit has a settlement function of making settlement of the charge for the customer's meal from the information of the card read by the card reader. This construction provides the advantage of enabling the charge for the customer's meal to be automatically settled.

Further, in the food and drink ordering system mentioned above, there is provided carrying means for carrying foods and drinks from the food and drink supplying place to the customer's table, and wherein the control unit includes an image control function of allowing an image displayed on the image display means to change one after another in accordance with developments of the ordered food and drink carried up to the designated customer's table via the carrying means, so as to give the information on the arrival of the order to the customer.

The display of the sequentially changing images on the image display means at the customer's table provides a visual confirmation of the conveyance of the customer's order, and as such can allow the customer to find joy in waiting for his/her order without being irritated.

DETAILED DESCRIPTION OF THE PREFERRED EMBODIMENT

In the following, description is given to a preferred embodiment of a food and drink ordering system according to the present invention with reference to the accompanying drawings. It is to be understood, however, that the scope of the invention is by no means limited to the illustrated embodiment.

Figure 1:
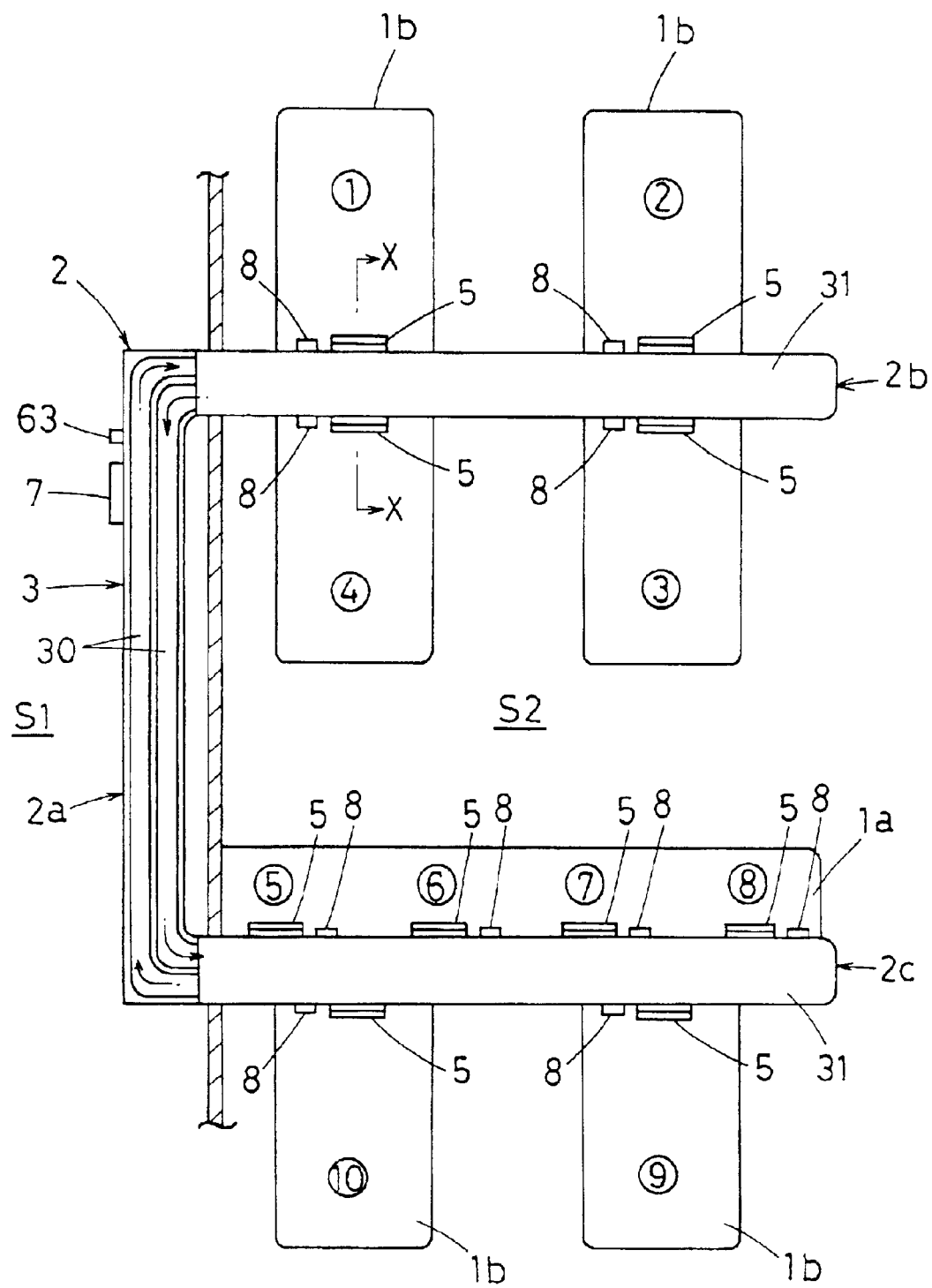
FIG. 1 is an illustration of an in-store space wherein a food and drink ordering system according to the present invention is placed.

Shown in FIG. 1 is an interior of a sushi restaurant including a kitchen section S1 and a customer section S2 as viewed from top, in which there are provided a counter 1a and a plurality of tables 1b set in the customer section S2, a compartment housing 2 arranged along a front side of the kitchen section S1 and along the counter and tables 1a and 1b, and a conveyance equipment 3 having a passageway 30 which is circularly arranged on the compartment housing 2 to carry e.g. sushi dished up on plates P in the kitchen section S1 to the customers' tables 1a and 1b. An endless chain of the passageway 30 has a flat surface for placing the plate P thereon.

Figure 2:
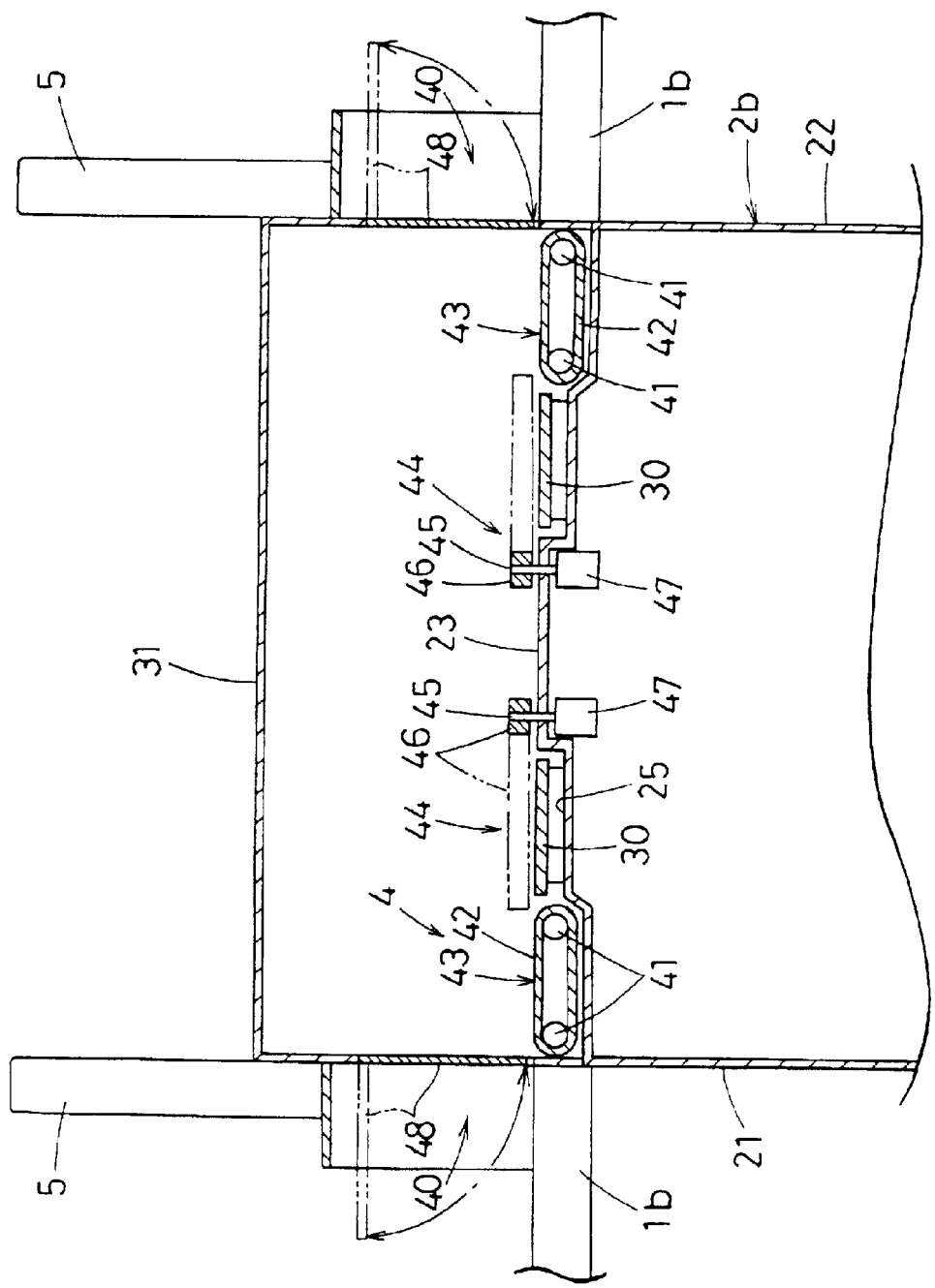
FIG. 2 is an enlarged sectional view taken along line X—X of FIG. 1.
Figure 3:
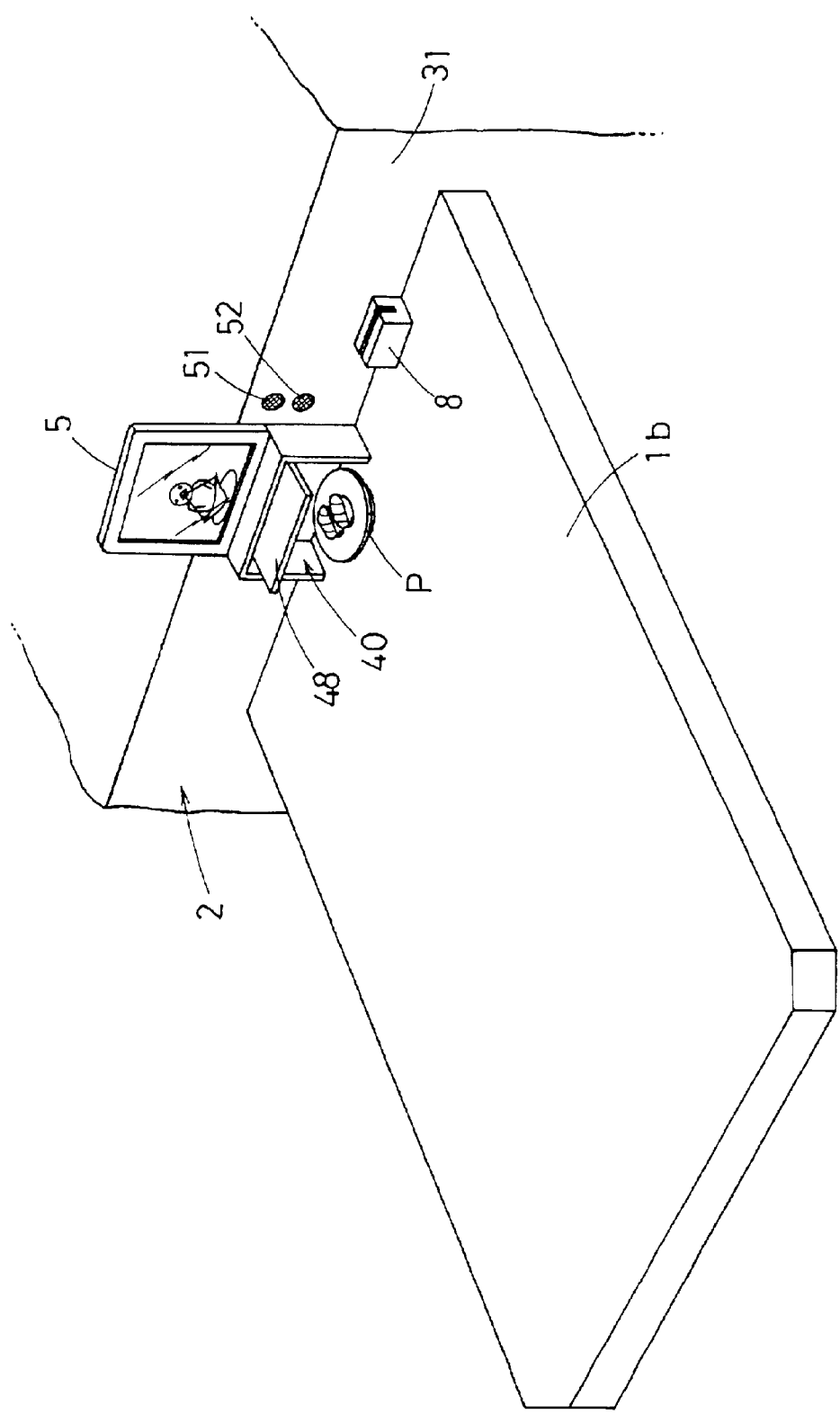
FIG. 3 is a perspective view of a principal part of the food and drink ordering system.

The compartment housing 2 having a box shape in section is formed by spaced apart, opposite, side walls 21 and 22, a top wall 23 and a bottom wall connecting between the both side walls 21 and 22 at upper and lower ends thereof, as shown in FIG. 2. The compartment housing 2 comprises a first housing portion 2a, arranged along the front side of the kitchen section S1, for separating the kitchen section S1 from the customer section S2, second and third housing portions 2b and 2c bending from both lengthwise ends of the first housing portion 2a and extending in parallel into the customer section S2. The top wall 23 of each of the housing portions 2a, 2b and 2c has a recess 25 in which the flat chain forming the passageway 30 of the conveyance equipment 3 is disposed. The counter 1a and the tables 1b are disposed at the outside of the side walls 21 and 22 of the second and third housing portions 2b and 2c.

The passageway 30 is covered with a tunnel-like cover 31 at the second and third housing portions 2b and 2c and is structured to carry the plates P placing thereon a variety of foods and drinks including sushi through the passageway 30 covered with the tunnel-like cover.

To selectively deliver the food and drink ordered by a customer to that customer's table, there is provided a select mechanism 4 at a location near each of the customers' tables. The select mechanism 4 is so structured that it can read identification information on the carried foods and drinks to select the ordered one among the carried foods and drinks and feed it out from an outlet 40 arranged on the table.

As schematically illustrated in FIG. 2, the select mechanism 4 comprises (i) a carry-out passageway 43 formed by an endless belt 42 extending between a pair of drive rollers 41 driven by a motor and (ii) a transferring device 44 for transferring the plate P from the passageway 30 to the carry-out passageway 43. The select mechanism 4 works in such a manner that the plate P on the passageway 30 is selectively transferred to the carry-out passageway 43 by the transferring device 44 and then is carried to the outlet 40 by the carry-out passageway 43.

As schematically illustrated in FIG. 2, the transferring device 44 includes a rotating shaft 45 rotatably mounted on the top wall 23 of the compartment housing 2, a guide member 46 whose one lengthwise end is fixed to an upper end portion of the rotating shaft 45, and a driving gear 47, such as a motor, assembled in a lower end portion of the rotating shaft 45 to be connected to an output side of a control unit 6 mentioned later. The driving gear 47 is controllably driven by the control unit 6, to swing the guide member 46 crosswise over the passageway 30, as indicated by a chain double-dashed line in FIG. 2, so as to transfer the plate P on the passageway 30 to the carry-out passageway 43.

5 denotes a touch screen display which is disposed over the outlet 40 in the table.

The outlet 40 is provided in the side wall 21 of the compartment housing 2 and also is provided with an open-and-close cover 48 which is controllably actuated to open and close by the drive motor 47. The open-and-close cover 48 serves to prevent dusts and the like from coming into the tunnel-like passageway 30 from the outlet 40.

The touch screen display 5 comprises a touch screen of liquid crystal display and a touch sensor loaded in a front face of the liquid crystal display and has the function of outputting an image specified by the customer who selects a certain image from among the images on item information and the like displayed on the touch screen and touches it with his/her finger.

In addition, the touch screen display 5 includes a microphone 51 and a speaker 52 which are disposed at the lateral side of the touch screen display 5.

Figure 4:
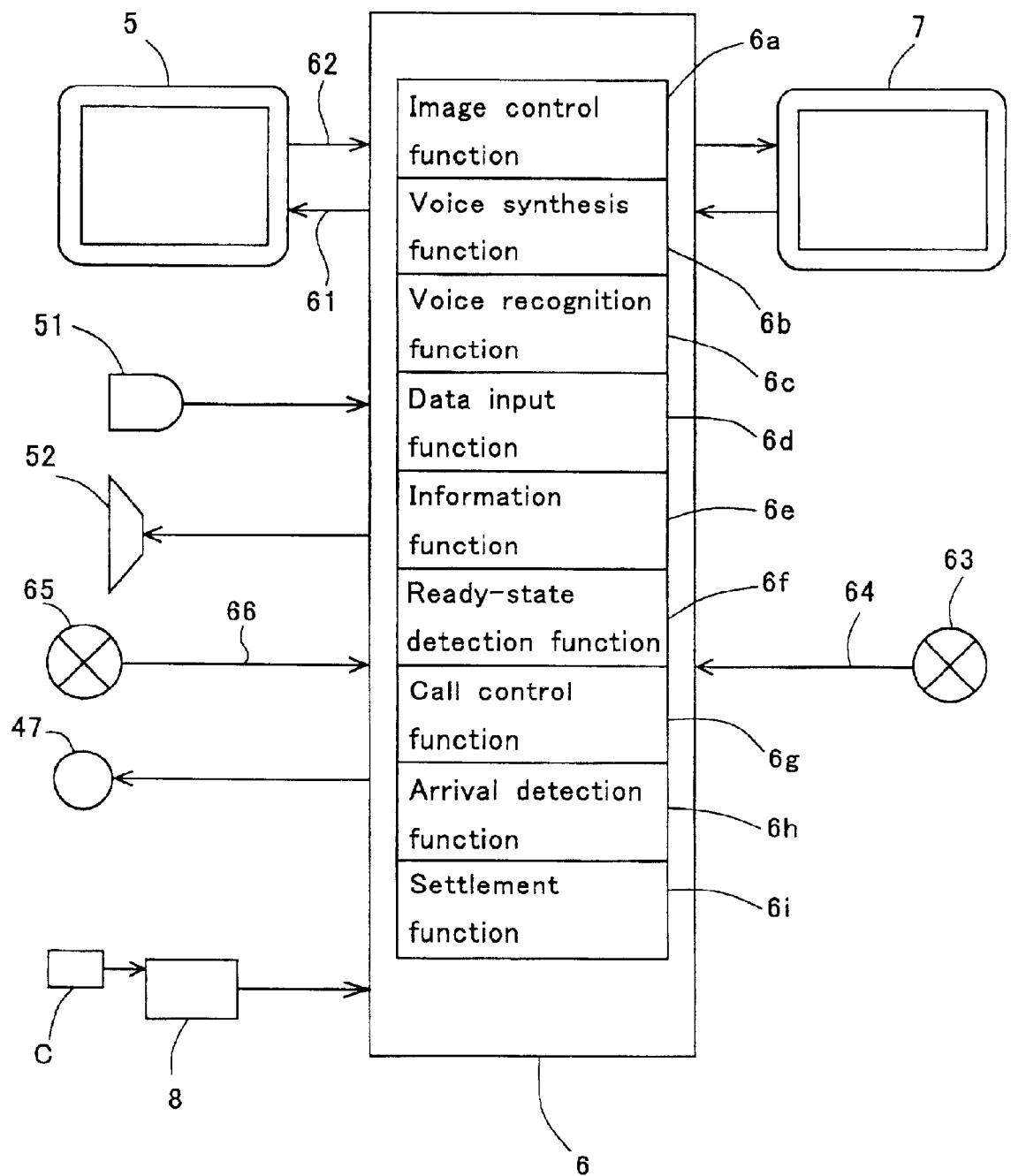
FIG. 4 is a block diagram of a food and drink ordering system.

FIG. 4 is a block diagram for illustrating a control system of the food and drink ordering system according to the present invention. In the diagram, 6 denotes a control unit. The control unit 6 has an image control function 6a of controlling the image displayed on the touch screen display 5 at the customer's table 2 through a data output line 61; a voice synthesis function 6b of emitting a synthetic voice from the speaker 52; a voice recognition function 6c of recognizing audio signals output from the microphone 51; a data input function 6d of recognizing the information on the image as was touched on the touch screen display 5 through a data input line 62; an information function 6e of displaying the information on the content and place of the order on a monitor 7 set in the kitchen section S1; a ready-state detection function 6f of receiving ready-state signals, which are output from an order-in-ready-state switch 63 set in the kitchen 1, through a ready-state-signal input line 64 and of detecting the timing at which the order was set on the belt of the passageway 30; a call control function 6g of connecting between a responsible cook or person in the kitchen and a selected customer via the microphone and speaker set in the kitchen; an arrival detection function 6h of receiving through an arrival signal line 66 arrival signals as are output from an arrival detecting sensor 65 for sensing the order coming near to the designated customer's table 2 to detect the timing at which the select mechanisms 4 is actuated; and a settlement function 6i of making settlement of the charge for the customer's meal from the information of the card C read by a card reader 8 mentioned later.

The settlement function 6i of the control unit 6 is used to retrieve the information on the cardholder recorded in the host computer of the card company online on the basis of the information of the card C read by the card reader 8 mentioned later, so as to settle the charge for the cardholder's meals.

The card reader 8 is set in each of the tables to read the information recorded on the card C having the function of making settlement of the charge for the purchased goods and services, such as a credit card, a prepaid card and the like.

The kitchen section S1 corresponds to the food and drink supplying place recited in Claim; the touch screen display 5 corresponds to the order input means and image display means recited in Claim; the passageway 30 and the select mechanism 4 correspond to the carrying means recited in Claim; and the monitor 7 corresponds to the order display means recited in Claim.

In the following, operation of the food and drink ordering system thus constructed will be described.

When a customer at the table swipes the card C through the card reader 8, the information recorded in the card C is read by the card reader 8 and is output to the control unit 6.

When the control unit 6 receives the information recorded in the card C, it retrieves a variety of information, including the information on a reported stolen card, from the host computer of the card company linked to the control unit 6 through its online facility. If the card C is found to have some problem, then the message of "Unfortunately, we cannot accept this card" is displayed on the screen of the touch screen display 5. On the other hand, if the card C is found to have no problem, then a standby screen display on the touch screen display 5 is switched to a screen display of a greeting image.

The greeting image is, for example, an animated cartoon of "a character of a food serve" in uniform of the restaurant or shop that makes greeting to customers. In sync with the screen display of the greeting image, the animated character bows in salutation, speaking "Welcome" to customers by a synthetic voice through the speaker 52.

Then, the screen display of the greeting image is switched in sequence to a screen-shot of demonstrating how to order and pay and then to another screen-shot of presenting menu demonstrating images of food and drinks available in the restaurant or shop and a brief explanation thereof. In sync with the screen-shots, the contents corresponding to the respective screen displays are announced by voice through the speaker 52.

An example of the menu demonstrating images displayed by the control unit 6 is described here.

Figure 5:
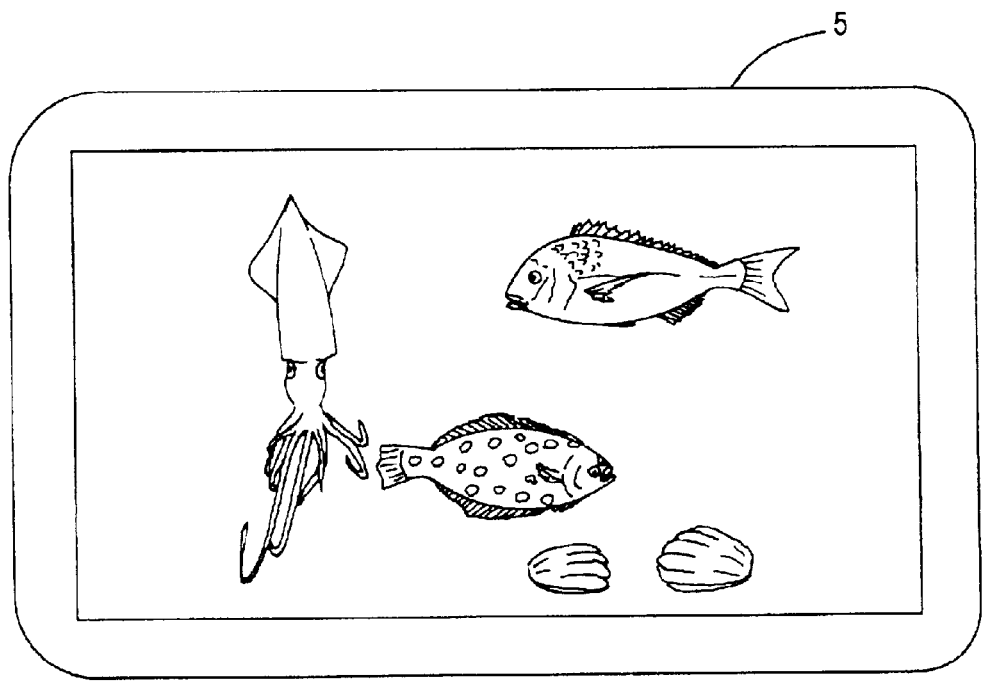
FIGS. 5(a) and 5(b) are illustrations of videos displayed on a display screen.
Figure 5:
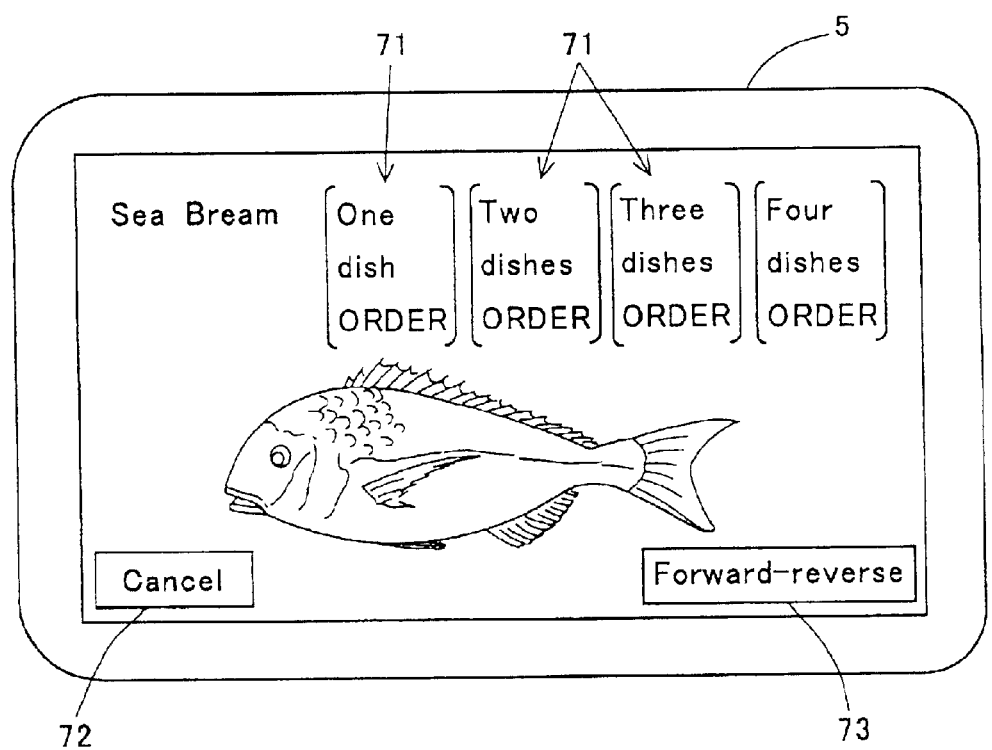

In the illustrated embodiment, the graphical content as shown in FIG. 5(a) is first displayed on the screen as the menu demonstrating image. Specifically, pictorial images of a variety of swimming fishes of stuff of sushi are displayed one after another on the screen.

When the customer touches the screen on any selected image of fish, e.g. "sea bream", the graphical content shown in FIG. 5(a) is switched to the screen-shot of demonstrating "how to order sushi" shown in FIG. 5(b). The pictorial image of "sea bream", "order quantity buttons 71" and other buttons are displayed on the screen and a brief explanation about the fish "seam bream" and about the sushi using the fish as the stuff of sushi is given by words and images and, if required, by voice.

The customer makes his/her order by touching the order quantity button 71. The customer can cancel the order by touching the cancel button 72 immediately after he/she has made the order.

The images displayed are not limited to the fishes, but a variety of goods may be displayed, including other stuffs of sushi, soups, deserts and drinks. These menu demonstrating images appear one after another.

When the customer touches the switch button 73 at the corner of the menu demonstrating screen-shot, the menu demonstrating screen-shot can be forcibly switched to another menu demonstrating screen-shot.

Alternatively or additionally, the customer can make the order through the microphone 51 by means of voice input.

The animation may be made so that when the order is made, an animated cartoon of "character of cook" appears on the screen and puts some words, such as e.g. "Would you like Wasabi?", in its mouth by synthetic voice, to make sure the details of the order, or present "Today's Recommendation".

Figure 7:
FIG. 7 is an illustration of an image displayed on a monitor.

When the customer determines his/her order by designating the order for food and drink and the order quantity in the manner mentioned above, the information on the place and content of the order is displayed on the monitor 7 set in the kitchen section S1 by the information function 6e of the control unit 6, as shown in FIG. 7.

The information on the place of the order means the information on the table number and the like corresponding to the orderer's table, and the information on the content of the order means the information on the kinds of foods and drinks, the number of the foods and drinks, and the like.

The cook or the working staff takes a look at the information and makes up the ordered food and drink.

The order as is in ready state is placed on the plate P having individual identification information and then is set on the passageway 30. Then, the responsible cook or person presses the order-in-ready-state switch 63.

The order-in-ready-state switch 63 may be replaced with a touch screen display for kitchen use.

Figure 6:
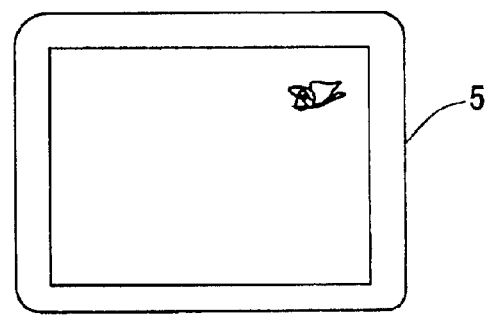
FIGS. 6(a)–6(d) are illustrations of videos displayed on the display screen.
Figure 6:
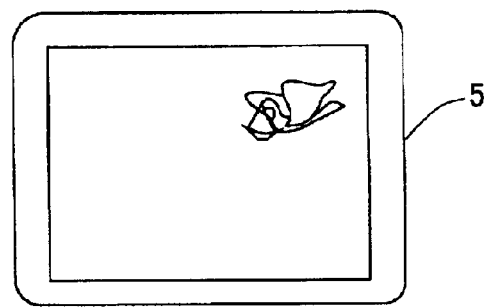
Figure 6:
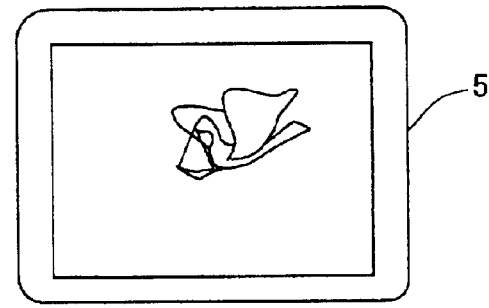
Figure 6:
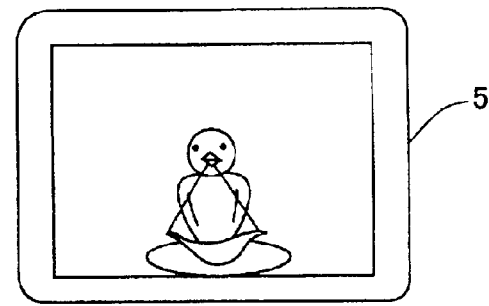

When the control unit 6 detects the order fed out from the kitchen by its image control function 6a, it calculates the time required for the order to be carried up to the orderer's table from the traveling distance between the kitchen and the orderer's table and the traveling speed and displays "an animated conveyance-suggestible image" on the touch screen display 5 at the customer's table, as illustrated in FIG. 6.

As illustrated by an example in FIG. 6, the animated conveyance-suggestible image of a character of "Lucky bird" appears at the corner of the screen, as shown in FIG. 6(a) and then is gradually zoomed in, as shown in FIG. 6(b) and 6(c), to suggest that the order is coming near to the orderer's table.

The animated cartoon of the character of "Luck bird" may be depicted as carrying the ordered food and drink by its claw or bill. Additionally, in sync with the display of the animation, some music may be put on.

In timing with the arrival of the order to the orderer's table, the animated conveyance-suggestible image becomes largest and the action of the animated bird putting the order on the table is displayed at the bottom of the screen, as shown in FIG. 6(d).

The arrival of the order can be confirmed by the identification data being read by the arrival detecting sensor 65 disposed in the vicinity of the select mechanisms 4 at the customer's table, as well. The drive motor 47 is controllably driven to open the open-and-close cover 42 in timing with the order arriving at the outlet 40 through the carry-out passageway 43.

Thus, the order can be carried out onto the table through the outlet 40 arranged on the table.

The display of "the animated conveyance-suggestible image" on the screen of the touch screen display 5 at the customer's table provides a visual confirmation of the conveyance of the customer's order, and as such can allow the customer to find joy in waiting for his/her order without being irritated.

It is to be noted that the customer can switch the animated conveyance-suggestible image to the menu demonstrating screen-shot, such as the screen-shot of demonstrating "how to order sushi", at any time even when the animated conveyance-suggestible image is displayed on the screen.

When the customer touches a bill button (not shown) displayed on the screen of the touch screen display 5 after he/she is through eating and drinking, the settlement function 6i of the control unit 6 works to settle the charge for the cardholder's meals automatically on the basis of the information of the card C read by the card reader 8.

This can eliminate the works at the cash register, including the payment of the charge for the meal and the receipt for the payment.

While in the embodiment illustrated above, "the animated conveyance-suggestible image" starts to be displayed on the screen of the touch screen display 5 at the customer's table from after the order is delivered from the kitchen, modification may be made in the invention such that "the animated conveyance-suggestible image" can start to be displayed from immediately after the order is made.

In this modification, for example, such an animation may be displayed that the ordered food and drink, such as sushi, is made up by "the animated character of cook", then is put into the hands of "the animated character of Lucky bird", and then is gradually coming near to the customer's table.

The display of this animation provides a visual check on the preparation of the customer's order from immediately after the order is made, and as such can prevent the customer from feeling bored.

Preferably, the foods and drinks and characters displayed are presented in the form of 3-D scenography to provide a more realistic display.

The animated characters of "cook", "Lucky bird" and the like may be selected according to the customer's preference.

The animated images may be displayed in accordance with the developments of the conveyance of the order by controllably increasing or decreasing the display rate when the previously produced animated image file is reproduced under control of the control unit 6. Alternatively, several image files each having different playback time may be prepared in advance so that the image file having the playback time proper for the place of the customer can be selectively displayed. In the latter case, since the distances between the kitchen and the respective tables are fixed and also the speed of conveyance is constant, the time required for the order to arrive at the respective tables can be calculated in advance.

Thus, when several image files having the playback time proper for the respective tables are prepared in advance and, when playing back, the image file proper for the place of the customer is selected, there can be provided the advantage of reducing the burden of the control unit when processing the image.

Alternatively, in playing back the animations, the texture data of the animated characters selected may be subjected to texture mapping by an animation display engine, to synthesize the images in sequence while being played back. This can provide the advantage of saving the required capacity for the image files.

Further, microcomputers each having the image processing function may be arranged in the customers' tables, respectively, so that a minimum amount of data on various control signals and order information can be communicated between the microcomputers and the general control unit that controls the overall data so that the distributed data processing of generation of animated images of characters and the like can be provided by the respective microcomputers at the customers' tables. This can provide the advantage of reducing the data transmission amount between the kitchen and the respective customers' tables.

While in the description above, the application of the food and drink ordering system of the present invention to the supply of sushi was taken as an example, the food and drink ordering system of the present invention is applicable to a variety of food and drink supply services including fast food shops, without being limited to the application to the supply of sushi.

What is claimed is:

1. A food and drink ordering system in an eating and drinking place enabling a customer to order any desired food and/or drink from the customer's table and providing the order to a food and drink supplying place comprising:

image display means and order input means for inputting information on food and drink being ordered, both of which are provided at the customer's table;

order display means, disposed at a food and drink supplying place, for displaying information on a content of an order and location at which the order was placed;

a control unit having a menu display function of displaying information regarding food and drinks on the image display means at the customer's table and an information function providing information on the ordered food and drink to the food and drink supplying place when the customer selects an item displayed on the image display means by use of the order input means; and carrying means for carrying food and drinks from the food and drink supplying place to the customer's table, wherein the control unit includes an image control function enabling an image displayed on the image display means to change in accordance with developments of the ordered food and drink being delivered to the customer's table via the carrying means, control function providing the customer with information on the status of the arrival of the ordered food and drinks to the customer's table.

2. The food and drink ordering system in the eating and drinking place according to claim 1, wherein a card reader for reading the information recorded in a card having the function of making settlement of the charge for purchased goods and services is set in the customer's table, and the control unit has a settlement function of making settlement of the charge for the customer's meal from the information of the card read by the card reader.

3. The food and drink ordering system in the eating and drinking place according to claim 1, further comprising a select mechanism for selectively delivering the ordered food and drinks to the customer's table in response to the control unit.

* * * * *